(12) United States Patent
Trainer et al.

(10) Patent No.: US 12,388,385 B2
(45) Date of Patent: Aug. 12, 2025

(54) ELECTRICAL POWER SYSTEM

(71) Applicant: ROLLS-ROYCE plc, London (GB)

(72) Inventors: David R. Trainer, Derby (GB); Ellis FH Chong, Derby (GB)

(73) Assignee: Rolls-Royce plc, London (GB)

( * ) Notice: Subject to any disclaimer, the term of this patent is extended or adjusted under 35 U.S.C. 154(b) by 280 days.

(21) Appl. No.: 18/333,855

(22) Filed: Jun. 13, 2023

(65) Prior Publication Data

US 2024/0007040 A1 Jan. 4, 2024

(30) Foreign Application Priority Data

Jul. 4, 2022 (GB) ...................................... 2209762

(51) Int. Cl.
*H02P 25/22* (2006.01)
*H02K 3/28* (2006.01)
*H02P 27/06* (2006.01)

(52) U.S. Cl.
CPC ............... *H02P 25/22* (2013.01); *H02K 3/28* (2013.01); *H02P 27/06* (2013.01)

(58) Field of Classification Search
CPC .... H02J 1/082; H02J 2207/20; H02J 2310/44; H02J 7/00712; H02J 9/062; H02K 3/28; H02M 1/007; H02M 1/008; H02M 1/32; H02M 7/219; H02P 1/00; H02P 2101/30; H02P 25/22; H02P 27/06; H02P 9/48
See application file for complete search history.

(56) References Cited

U.S. PATENT DOCUMENTS

| | | | |
|---|---|---|---|
| 5,274,322 A | 12/1993 | Hayashi et al. | |
| 2013/0208521 A1* | 8/2013 | Trainer | H02M 7/4835 363/126 |
| 2017/0264178 A1* | 9/2017 | Stauder | H02K 11/33 |

FOREIGN PATENT DOCUMENTS

| | | | | |
|---|---|---|---|---|
| AU | 2013284381 A1 * | 2/2015 | ............. | H02J 3/383 |
| DE | 102018211968 A1 | 1/2020 | | |
| EP | 3832827 A1 | 6/2021 | | |
| EP | 3832872 A1 | 6/2021 | | |
| WO | 2021123673 A1 | 6/2021 | | |

OTHER PUBLICATIONS

AU-2013284381-A1, all pages (Year: 2015).*
(Continued)

*Primary Examiner* — Naishadh N Desai
(74) *Attorney, Agent, or Firm* — Shumaker & Sieffert, P.A.

(57) ABSTRACT

The disclosure relates to an electrical power system for connecting an electrical machine to first and second DC networks operating at different voltages. Example embodiments include an electrical power system comprising: an electrical machine having first and second pluralities of windings; a first AC:DC power electronics converter connected to the first plurality of windings; a second AC:DC power electronics converter connected to the second plurality of windings; a switching controller configured to provide switching signals to the first and second AC:DC power electronics converters to provide a first DC supply at a DC side of the first AC:DC power electronics converter and a second DC supply at a DC side of the second AC:DC power electronics converter.

20 Claims, 13 Drawing Sheets

(56) References Cited

OTHER PUBLICATIONS

Extended Search Report from counterpart European Application No. 23177225.2 dated Dec. 7, 2023, 7 pp.
Response to Extended Search Report dated Dec. 7, 2023, from counterpart European Application No. 23177225.2 filed Mar. 21, 2024, 53 pp.
Great Britain search report dated Dec. 15, 2022, issued in GB Patent Application No. GB 2209762.0.

* cited by examiner

ELECTRICAL POWER SYSTEM

CROSS-REFERENCE TO RELATED APPLICATIONS

This specification is based upon and claims the benefit of priority from United Kingdom Patent Application No. 2209762.0, filed 4 Jul. 2022, the entire contents of which are incorporated herein by reference.

BACKGROUND

Technical Field

This present disclosure relates to an electrical power system for connecting an electrical machine to first and second DC networks operating at different voltages.

Description of the Related Art

In aerospace, the more electric engine (MEE) and more electric aircraft (MEA) concepts are seen as being increasingly attractive due to their potential to reduce fuel consumption. For example, one known aircraft configuration includes electric machines in its engines which are operable as both motors and generators. This facilitates both generation of electrical power during flight and starting of the engine, allowing removal of the air-turbine starter and attendant bleed air ducting. One engine configuration for this known aircraft includes such electric machines coupled to the high-pressure spool of a twin-spool turbofan. Another includes such electric machines coupled to the intermediate-pressure spool of a triple-spool turbofan.

Current trends are tending to support an increase in the distribution voltage to facilitate higher power loads such as electrically driven propulsors, with a voltage level of $540V_{DC}$, or $+/-270V_{DC}$, being proposed. While current use of loads operating at $270V_{DC}$ continues, it may be beneficial to derive both voltage levels from a common gas turbine engine to enable current systems to continue to be used. Doing so can, however, result in additional complexity and weight if using multiple generators and converters.

Example electrical systems for connecting rotary electrical machines to two DC networks are disclosed in EP 3832827 A1 and EP 3832872 A1, in which combinations of AC:DC and DC:DC converter circuits are used to generate multiple DC outputs. Using additional DC:DC converter circuits, however, adds weight and complexity and increases electrical losses in transforming electrical power from an electrical machine to a DC network.

Thus, it is an object of the invention to provide an electrical system to facilitate more efficient transfer of power between an electrical machine and DC electrical networks operating at different voltages.

SUMMARY

According to a first aspect there is provided an electrical power system comprising:
an electrical machine having first and second pluralities of windings;
a first AC:DC power electronics converter connected to the first plurality of windings;
a second AC:DC power electronics converter connected to the second plurality of windings;
a switching controller configured to provide switching signals to the first and second AC:DC power electronics converters to provide a first DC supply at a DC side of the first AC:DC power electronics converter and a second DC supply at a DC side of the second AC:DC power electronics converter,
wherein the windings of the first plurality of windings are connected to the first AC:DC power electronics converter in a star configuration and the windings of the second plurality of windings are connected to the second power electronics converter in a delta configuration.

In some examples the first plurality may be equal to the second plurality. In other examples the first and second plurality may differ.

In some examples a first number of turns in each winding of the first plurality of windings is greater than a second number of turns in each winding of the second plurality of windings.

In some examples the first number is between 5% and 20% greater than the second number.

In some examples the switching controller is configured to provide the first DC supply at a first voltage level of between 1.5 to 2.5 times that of a second voltage level of the second DC supply.

In some examples the first voltage level is around twice that of the second voltage level. The first voltage level may for example be 540V and the second voltage level 270V.

In some examples the first and second AC:DC power electronics converters are each configured to provide an output power of up to 100 kW.

In some examples the first and second pluralities of windings are provided on a common stator of the electrical machine.

In some examples the windings of the first plurality of windings are disposed in a first circumferential span around the stator and the windings of the second plurality of windings are disposed in a second circumferential span around the stator.

In some examples the first and second circumferential spans are non-overlapping.

In some examples the first circumferential span is greater than the second circumferential span.

In some examples the electrical machine comprises third and fourth pluralities of windings, the electrical power system further comprising a third AC:DC power electronics converter connected to the third plurality of windings and a fourth AC:DC power electronics converter connected to the fourth plurality of windings, windings of the third plurality of windings connected to the third AC:DC power electronics converter in a star configuration and the windings of the fourth plurality of windings connected to the fourth AC:DC power electronics converter in a delta configuration, the switching controller configured to provide switching signals to the third and fourth AC:DC power electronics converters to provide a third DC supply at a DC side of the third AC:DC power electronics converter and a fourth DC supply at a DC side of the fourth AC:DC power electronics converter, wherein the windings of the third plurality of windings are disposed in a third circumferential span around the stator and the windings of the fourth plurality of windings are disposed in a fourth circumferential span around the stator.

In some examples the third and fourth circumferential spans are non-overlapping with each other and with the first and second circumferential spans. In some examples the third circumferential span is greater than the fourth circumferential span.

According to a second aspect there is provided an aircraft power and propulsion system comprising:

a gas turbine engine; and
an electrical power system according to the first aspect, wherein the electrical machine of the electrical power system is mechanically coupled with a spool of the gas turbine engine.

In some examples the spool is a starting spool of the gas turbine engine. The first and second AC:DC power electronics converters are bi-directional converters. The electrical machine is operable in a motor mode in which one or more power sources supply electrical power to the first plurality of windings via the first AC:DC power electronics converter and to the second plurality of windings via the second AC:DC power electronics converter.

The starting spool may be a high-pressure (HP) spool of a two- or three-shaft gas turbine engine. The starting spool may be an intermediate-pressure (IP) spool of a three-spool gas turbine engine.

The one or more power sources may include an on-board energy storage systems, for example a battery. Additionally or alternatively, a ground-based power source may be used to supply electrical power to the windings.

The aircraft power and propulsion system may further comprise a DC to DC power electronics converter including an intermediate transformer having a primary winding, a first secondary winding and a second secondary winding. The primary winding is connected to the energy storage system. The first secondary winding is connected to the first DC supply. The second secondary winding is connected to the second DC supply.

The first and second secondary windings of the intermediate transformer may have different numbers of turns. In an embodiment, a ratio of the number of turns may be between 1.5 and 2.5, for example 2.

In some examples, the on-board energy storage system may supply the first DC supply with electrical power via the first secondary winding, and supply the second DC supply via the second secondary winding.

In other examples, a respective one of the first and second DC supplies receives electrical power directly from a further power source, and the other of the first and second DC supplies receives power from said respective one of the first and second DC supplies via the secondary windings of the DC to DC converter.

According to a third aspect there is provided an aircraft comprising the power and propulsion system according to the second aspect. The aircraft may be a hybrid electric aircraft.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

FIG. 1

Figure 1:
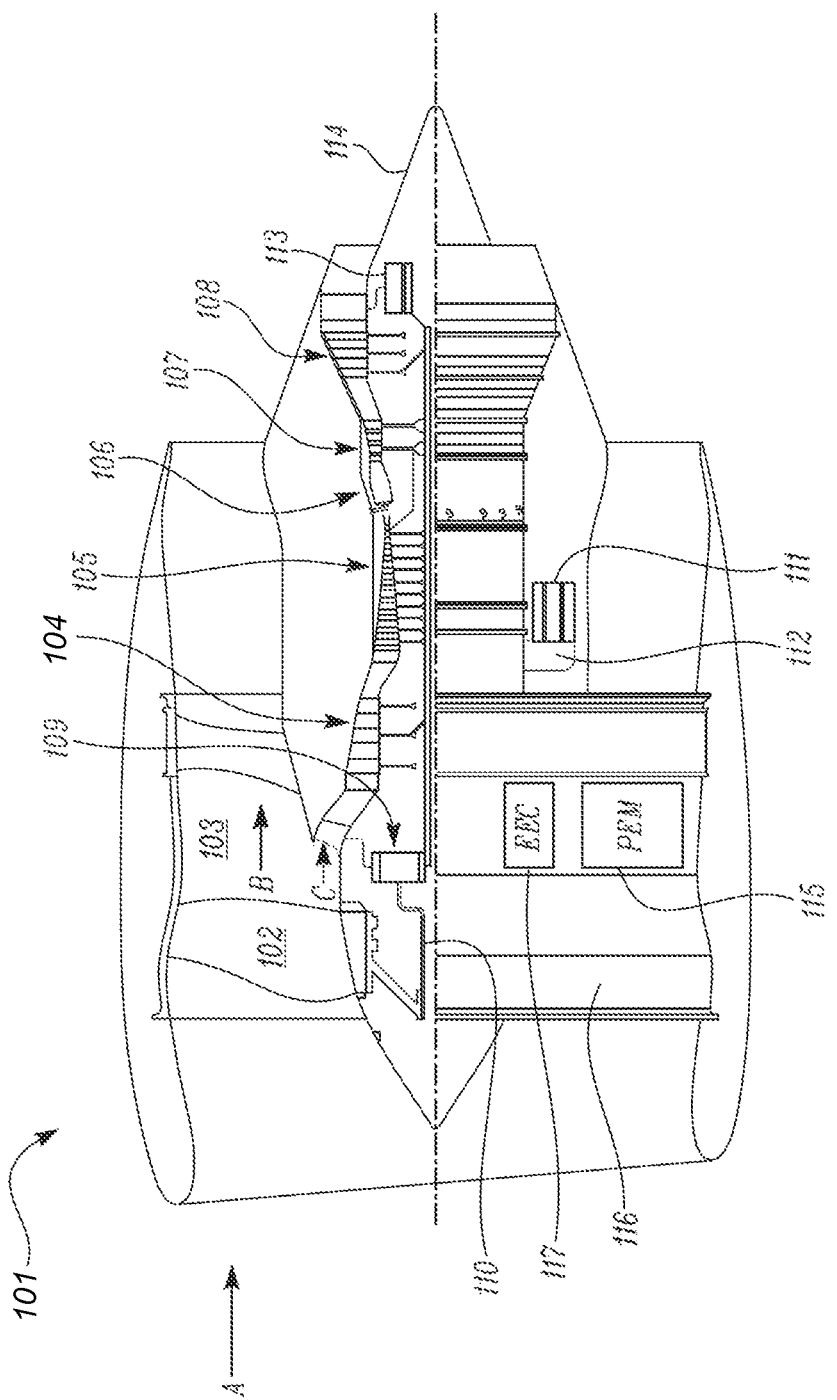
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of FIG. 1 comprises one or more rotary electrical machines, generally capable of operating both as a motor and as a generator. The number and arrangement of the rotary electrical machines will depend to some extent on the desired functionality. Some embodiments of the engine 101 include a single rotary electrical machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electrical machine 111 coupled with the high pressure spool and a second rotary electrical machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electrical machine 111 is driven by the high-pressure spool by a core-mounted accessory drive 112 of conventional configuration. In alternative embodiments, the first electrical machine 111 may be mounted coaxially with the turbomachinery in the engine 101. For example, the first electrical machine 111 may be mounted axially in line with the duct between the low- and high-pressure compressors 104 and 105. In FIG. 1, the second electrical machine 113 is mounted in the tail cone 114 of the engine 101 coaxially with the turbomachinery and is coupled to the low-pressure turbine 108. In alternative embodiments, the second rotary electrical machine 113 may be located axially in line with low-pressure compressor 104, which may adopt a bladed disc or bladed drum configuration to provide space for the second rotary electrical machine 113. It will of course be appreciated by those skilled in the art that any other suitable location for the first and (if present) second electrical machines may be adopted.

The first and second electrical machines 111, 113 are connected with power electronics. Extraction of power from or application of power to the electrical machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electrical machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e. both of the core gas turbine and the first and second electrical machines 111 and 113. In this way, the EEC 117 may holistically respond to both thrust demand and electrical power demand.

The one or more rotary electrical machines 111, 113 and the power electronics 115 may be configured to output to or receive electric power from one, two or more dc busses. The dc busses allow for the distribution of electrical power to other engine electrical loads and to electrical loads on the airframe.

Those skilled in the art will appreciate that the gas turbine engine 101 described above may be regarded as a 'more electric' gas turbine engine because of the increased role of the electrical machines 111, 113 compared with those of conventional gas turbines.

Figure 2A:
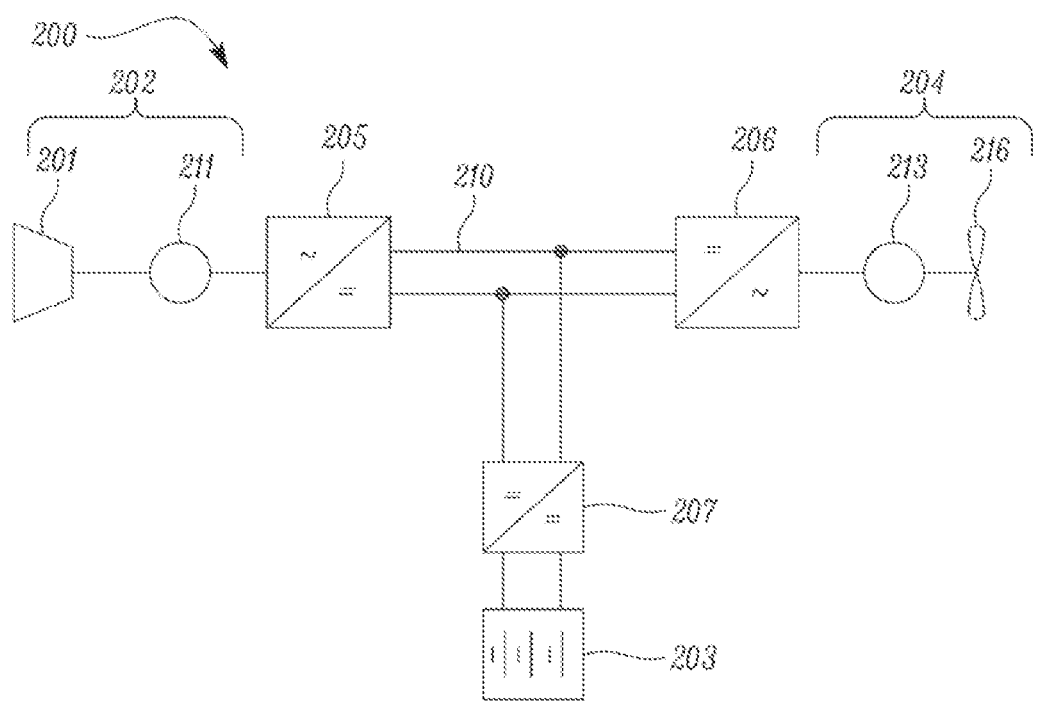
FIG. 2A is a schematic illustration of a hybrid electric aircraft propulsion system.
Figure 2B:
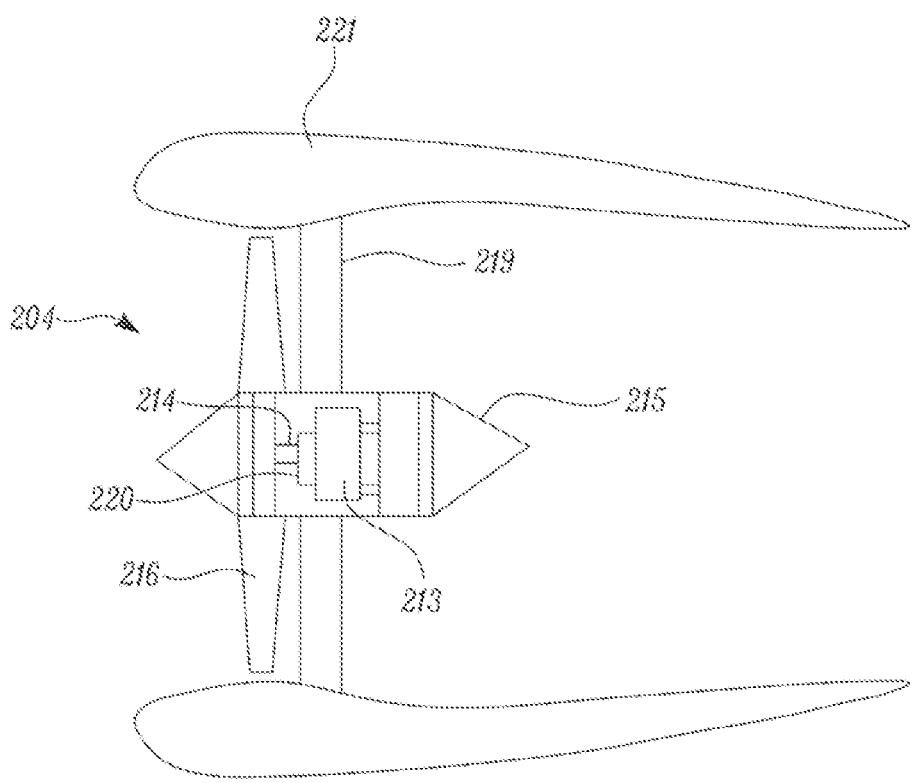
FIG. 2B illustrates an electrically powered propulsor such as may be used in a hybrid electric propulsion system.

FIGS. 2A and 2B

FIG. 2A illustrates an exemplary propulsion system 200 of a hybrid electric aircraft. The propulsion system 200 includes a generator set 202 comprising a gas turbine engine 201 and electrical generator 211, and a battery pack 203. Both the generator set 202 and the battery pack 203 are used as energy sources to power a motor-driven propulsor 204, an example of which is shown in FIG. 2B.

The illustrated propulsion system 200 further comprises an AC/DC converter 205, a dc distribution bus 210, a DC/AC converter 206 and a DC/DC converter 207. It will be appreciated that whilst one generator set 202 and one propulsor 204 are illustrated in this example, a propulsion system 200 may include more than one generator set 202 and/or one or more propulsor 204.

A shaft or spool of the engine 201 is coupled to and drives the rotation of a shaft of the generator 211 which thereby produces alternating current. The AC/DC converter 205, which faces the generator 211, converts the alternating current into direct current which is fed to various electrical systems and loads via the dc distribution bus 210. These electrical systems include non-propulsive loads (not shown in FIG. 2A) and the motor-driven propulsor 204, which comprises a motor 213 which drives a propulsor 204 via the DC/AC converter 206.

The battery pack 203, which may be made up of a number of battery modules connected in series and/or parallel, is connected to the dc distribution bus 210 via the DC/DC converter 207. The DC/DC converter 207 converts between a voltage of the battery pack 203 and a voltage of the dc distribution bus 210. In this way, the battery pack 203 can replace or supplement the power provided by the generator set 202 (by discharging and thereby feeding the DC distribution bus 210) or can be charged using the power provided by the generator set 202 (by being fed by the dc distribution bus 210).

Referring to FIG. 2B, in this example the propulsor 204 takes the form of a ducted fan. The fan 216 is enclosed within a fan duct 219 defined within a nacelle 221 and is mounted to a core nacelle 215. The fan 216 is driven by the electrical machine 213 via a drive shaft 214, both of which may also be thought of as components of the propulsor 204. In this embodiment a gearbox 220 is provided between the electrical machine 213 and the drive shaft 214.

The electrical machine 213 is supplied with electric power from a power source, for example the generator set 202 and/or the battery 203 via the dc bus 210. The electrical machine 213 of the propulsor, and indeed the electrical machine 211 of the generator set 202, may be of any suitable type, for example of the permanent magnet synchronous type.

Those skilled in the art will recognise the propulsion system 200 of FIGS. 2A-B to be of the series hybrid type. Other hybrid electric propulsion systems are of the parallel type, while still others are of the turboelectric type or have features of more than one type. The configuration of the more electric engine 101 of FIG. 1 may be considered similar to a parallel hybrid system, with the main distinction being the roles of the electrical machines. For example, the electrical machines of a more electric engine are generally only used in motor mode to start the engine and to improve engine operability, whereas the electric machines of a parallel hybrid propulsion system are used to motor the spools to meaningfully add to the amount of propulsive thrust produced by the turbomachinery.

FIG. 3

Figure 3:
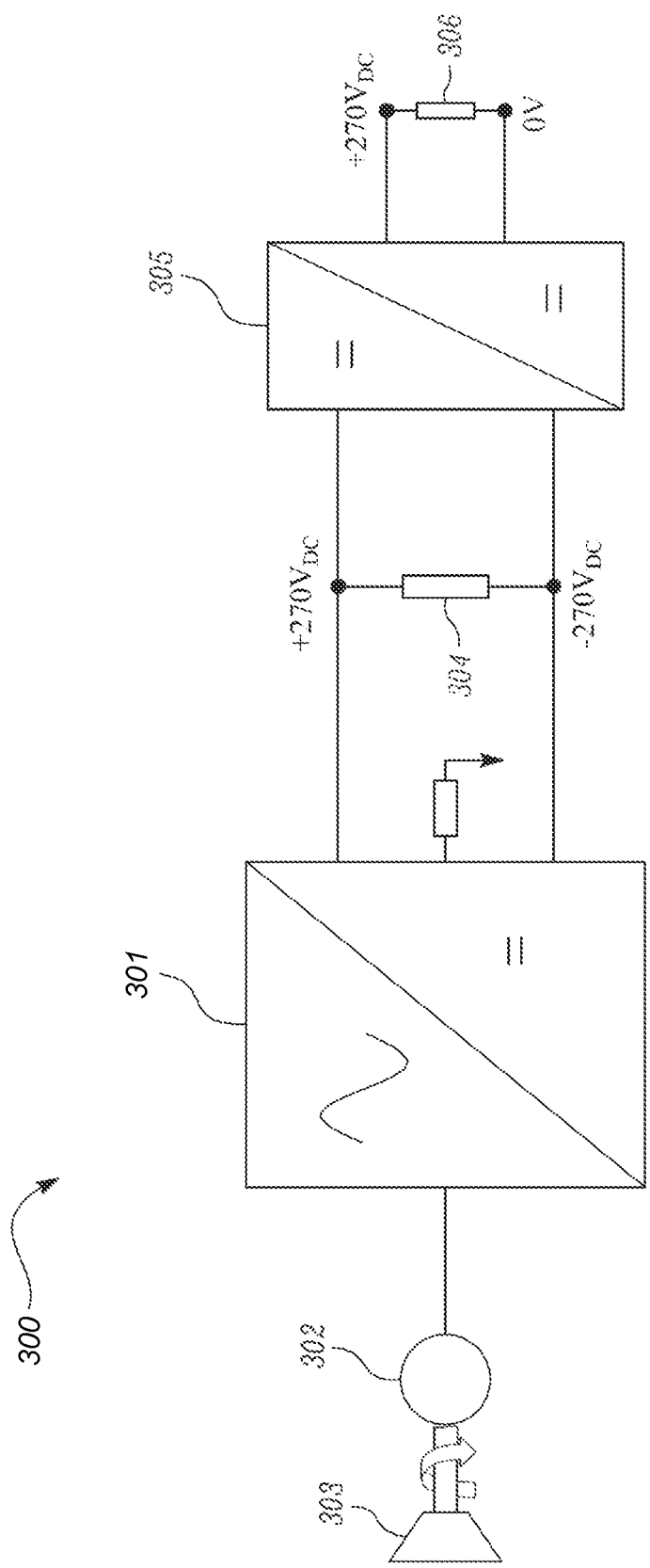
FIG. 3 is a schematic diagram of an example electrical power system providing first and second DC output supplies.

FIG. 3 is a schematic diagram illustrating an electrical power system 300 configured to provide first and second DC supplies, in this example providing a first DC supply at $540V_{DC}$ (or $+/-270V_{DC}$) and a second DC supply at $270 V_{DC}$. The first DC supply is provided by an AC:DC converter 301, which converts an AC supply provided by an electrical machine 302 driven by a gas turbine 303, the first DC supply connected across a first load 304. The second supply is provided by a DC:DC converter 305, which converts the first DC supply to the lower second DC supply. The second DC supply is connected across a second load 306. To provide each of the loads 304, 306 with the same power, the AC:DC converter 301 needs to be rated at twice this power, for example with the loads 304, 306 rated at 100 kW the AC:DC converter needs to be rated at 200 kW and the DC:DC converter rated at 100 kW. The total rating of the power converters 301, 305 therefore needs to be 300 kW to supply a combined load of 200 kW.

FIG. 4

Figure 4:
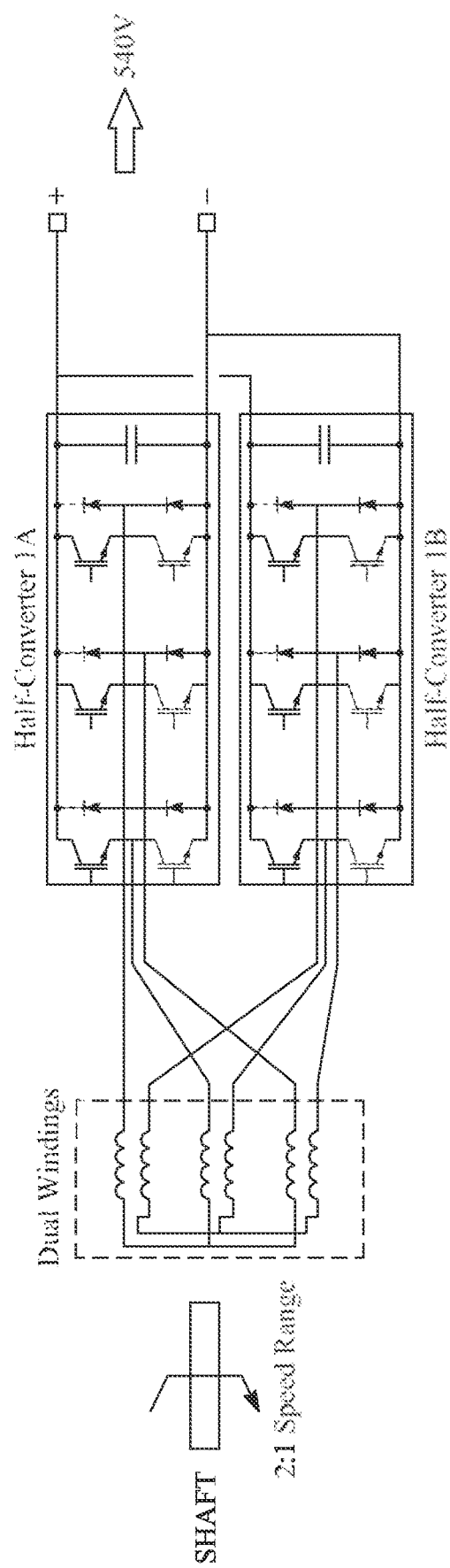
FIG. 4 is a schematic diagram of an example electrical power system using first and second power electronics converters to provide a DC output supply from a common electrical machine.

FIG. 4 is a schematic diagram illustrating an electrical power system 400 in which the AC:DC converter 401 is divided into first and second AC:DC converters 401a, 401b. The converters 401a, 401b together provide the higher DC voltage supply of 540V by connecting the converters 401a, 401b in parallel. In the illustrated example, the electrical machine 402 comprises two identical sets of 3-phase windings that are connected to the first and second converters 401a, 401b respectively. Each set of windings is connected in a star configuration. This winding arrangement presents alternating voltages of equal magnitude to the converters 401a, 401b, resulting in equal DC output voltage supplies, enabling the converters 401a, 401b to be connected in parallel to supply the higher combined DC voltage supply.

For aerospace applications, generators are often connected to the rotating shafts of a gas turbine engine used for propulsion and are typically required to generate electrical power over a 2:1 speed range. The use of power dense permanent magnet (PM) generators results in an associated 2:1 change in the voltage (back EMF) produced by the machine as the rotational speed changes, which has to be compensated for by the power electronics converter to deliver a stabilised $540V_{DC}$ supply voltage. It may not be practical for the two half-converters 401a, 401b illustrated in FIG. 4 to change the DC side voltage further by control action alone to produce both $540V_{DC}$ and $270V_{DC}$ supplies in the presence of such a large speed range.

FIG. 5

Figure 5:
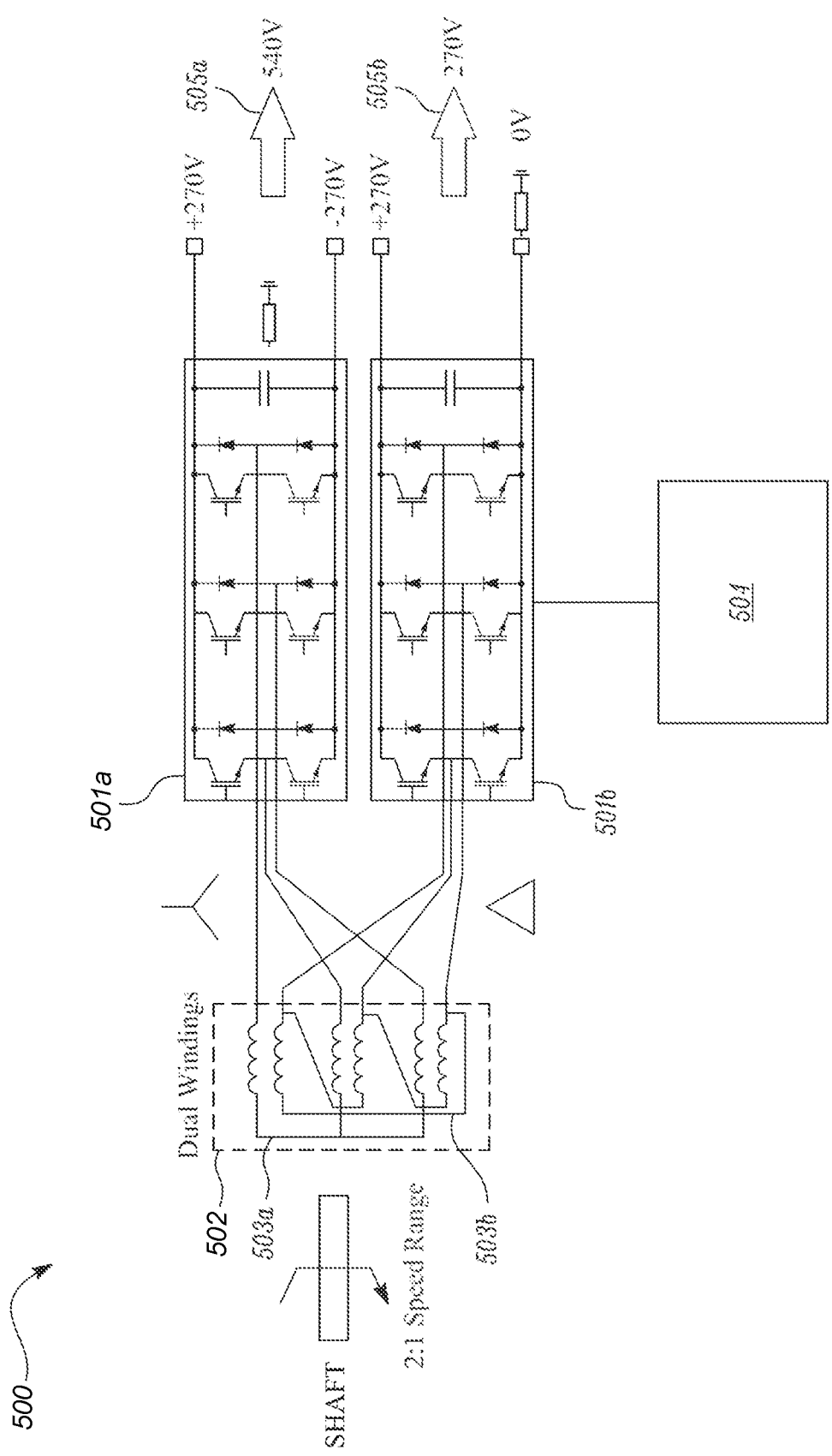
FIG. 5 is a schematic diagram of an example electrical power system using first and second power electronics converters to provide first and second DC output supplies from a common electrical machine.

FIG. 5 is a schematic diagram of an example electrical power system 500 comprising an electrical machine 502 with first and second pluralities of windings 503a, 503b connected to respective first and second power electronics converters 501a, 501b. Each set of windings 503a, 503b in the illustrated example comprises three windings. In other examples the number of windings may be different and the number of windings in each set may differ.

A switching controller 504 is configured to provide switching signals to the power converters 501a, 501b to provide a first DC output supply 505a from the first power converter 501a and a second DC output supply 505b from the second power converter 501b. The first DC output supply 505a in this example is 540V and the second DC output supply 505b is 270V. In a more general aspect, the first DC output supply 505a may be at a first voltage level of between around 1.5 to 2.5 times that of a second voltage level of the second DC output supply 505b. The first voltage level may for example be around twice that of the second voltage level.

Both converters 501a, 501b may be configured to provide similar output power levels, for example output power levels of up to around 100 kW. Compared with the previous example illustrated in FIG. 3, the overall power rating of the converters 501a, 501b is reduced to around 200 kW in total, rather than 300 kW in total for the electrical power system 300 of FIG. 3.

The first set of windings 503a is connected to the first power converter 501a in a star configuration, while the second set of windings 503b is connected to the second power converter 501b in a delta configuration. If the same number of turns is present on each of the windings, this results in around a 1.732:1 difference in AC voltage provided to each converter, i.e., with the first power converter 501a being provided with an AC voltage supply 1.732 times that of the AC voltage supply provided to the second converter 501b. As a result, it becomes practical to provide the first and second output DC supplies 505a, 505b at widely different voltage levels even with a 2:1 shaft speed range requirement.

For the delta connected set of windings 503b, the line to line voltage presented to the AC terminals of the second converter 501b is equal to the voltage generated by one stator phase winding. In contrast, the line to line voltage presented to the first converter 501a is the addition of two phase-displaced stator phase windings operating 120 electrical degrees apart and is 1.732 (V) times higher. Although this does not result in a perfect 2:1 match in the voltage ratios between the AC and DC sides, the switching controller 504 can adjust operation of the converters 501a, 501b to compensate for this difference.

This arrangement is particularly suitable to applications where the loads connected across the first and second DC output supplies 505a, 505b are nominally equal, for example 100 kW each. If all windings have the same number of turns and produce the same magnitude of voltage, each phase for a three-phase supply will contribute one third of the total power and thus must conduct the same current. This simplifies the design of the machine because each winding can be made identical in its construction and with the same number of turns.

In alternative arrangements, the 1.732:1 voltage ratio described above can be changed if the number of turns in the phase windings connected in the star configuration is made slightly higher than phase windings connected in delta. For example if each winding of the star winding set 503a contains around 15% more turns than each winding of the delta winding set 503b, the AC voltages presented to the respective converters 501a, 501b would become almost 2:1. This alternative may lend itself to machine designs containing a high number of turns, in which a 15% increase is possible whilst maintaining an integer number of turns. However, even with a moderate number of turns, for example 10 turns on each of the delta connected windings, some improvement would be gained if the number of turns on the star connected machine were increased by 10% to 11, which would result in a 1.9:1 ratio of the AC side voltages. This would reduce the burden on the converter control to compensate for the error between the AC and DC side voltage ratios. In a general aspect therefore, in some examples the number of turns in each winding of the first set of windings may be greater than the number of turns in each winding of the second set of windings, such as between around 5% and 20% greater. In a particular example, each winding of the first set of windings may have around 15% more turns than each winding of the second set of windings.

FIG. 6

As the power drawn from each DC power supply 505a, 505b changes, the current in the star and delta connected windings 503a, 503b must change in proportion to the change in power drawn. The frequency of the alternating voltage and current at each phase winding is set by the rotating speed of the shaft driving the electrical machine 502 acting as a generator. The phase angle of the current is controlled by the switching operation of each converter 501a, 501b and its operating power factor, meaning the current in each related phase windings, can also be the same. Operating in this manner is possible even where there is close magnetic coupling between the same-phase coils. Here the Magneto Motive Force [MMF/Ampere-Turns] contributed by each phase winding simply add as the currents are in-phase and the number of turns equal. However, alternative examples may be envisaged where the sets of windings have minimal coupling between them, with the result that the currents may be different with little or no direct influence on each other. This approach would enable different numbers of turns in each set of windings to be used in addition to catering for a wide range of differing load conditions. This would also enable the power factor of each half-converter to be altered and to be different [e.g., field weakening] if desired.

Figure 6:
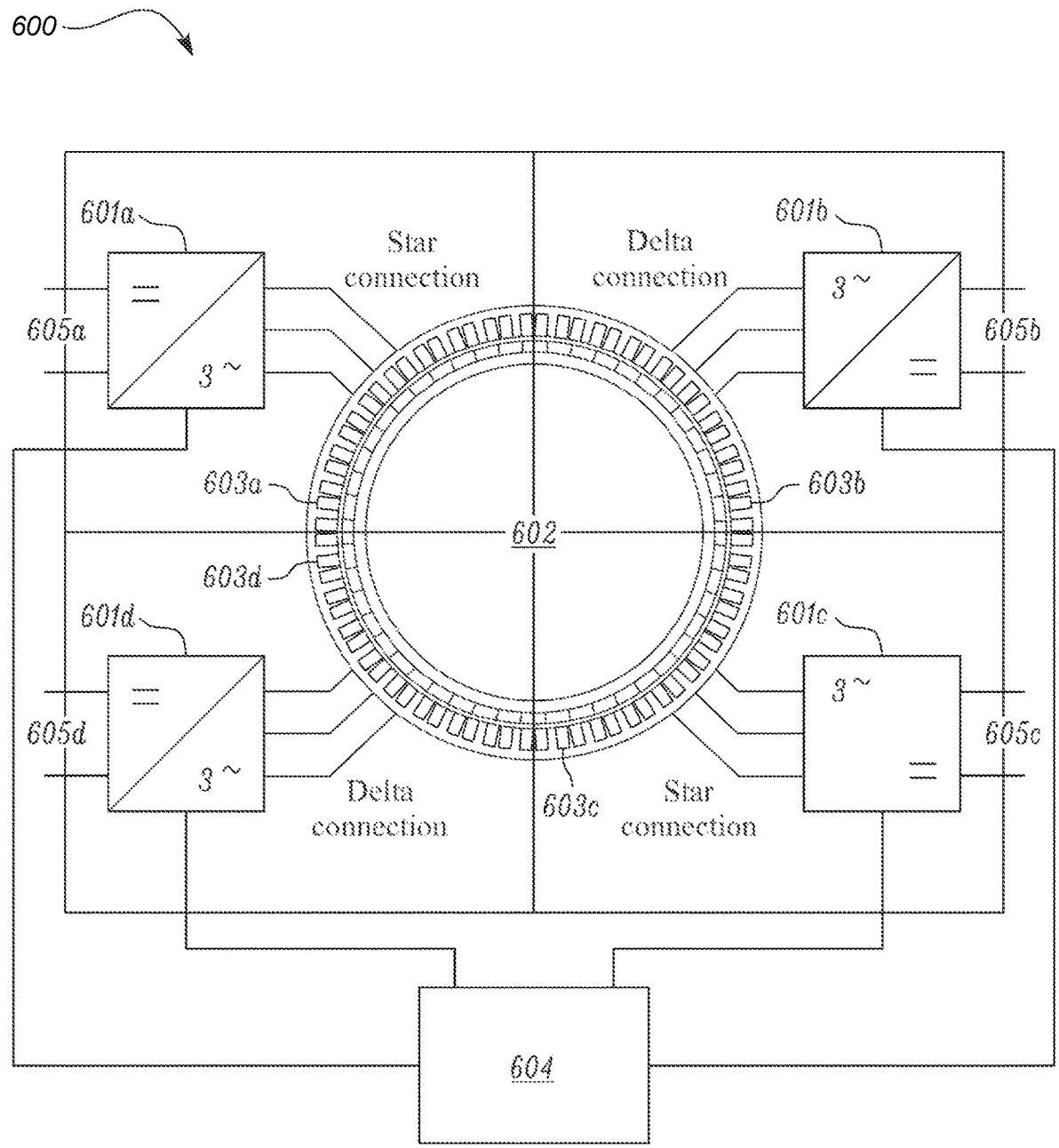
FIG. 6 is a schematic diagram of an example electrical power system with four power electronics converters connected to corresponding sets of windings on an electrical machine.

FIG. 6 illustrates an example electrical power system 600 having an electrical machine 602 with two star connected sets of windings 603a, 603c and two delta connected sets of windings 603b, 603d. Each of the circumferential spans of the pluralities of windings 603a-d are non-overlapping to minimise coupling between the windings. Each set of windings 603a-d is connected to a respective power electronics converter 601a-d. The power electronics converters 601a-d provide respective DC output supplies 605a-d [i.e. generating four power buses] with minimal coupling between the sets of windings. Such an approach lends itself to fault tolerant power systems where power could continue to be fed, for example, to three power buses in the event of a fault and isolation of one of the supplies 605a-d. This winding arrangement ensures that an electrical machine is magnetically balanced during its normal operation, whilst minimises its magnetic imbalance during fault condition.

The winding arrangement illustrated in FIG. 6 is appropriate for the case where, for example, loadings from $540V_{DC}$ and $270 V_{DC}$ power buses are equal for most of times with occasional unequal loadings. For the case where the $540V_{DC}$ and $270V_{DC}$ power buses have permanently different loadings, the winding arrangement in FIG. 6 has the benefit of being easily adapted to facilitate different power ratings by changing the circumferential spatial winding distribution. For example, if the star-connected windings 603a, 603c have twice the power output (e.g., 200 kW) as the delta-connected windings 603b, 603d (e.g., 100 kW), then an electrical machine 602 would be better optimised if the two star-connected windings have a 120 degree circumferential span instead of 90 degree, resulting in the two delta connected windings correspondingly having a 60 degree circumferential span.

FIG. 7

Figure 7:
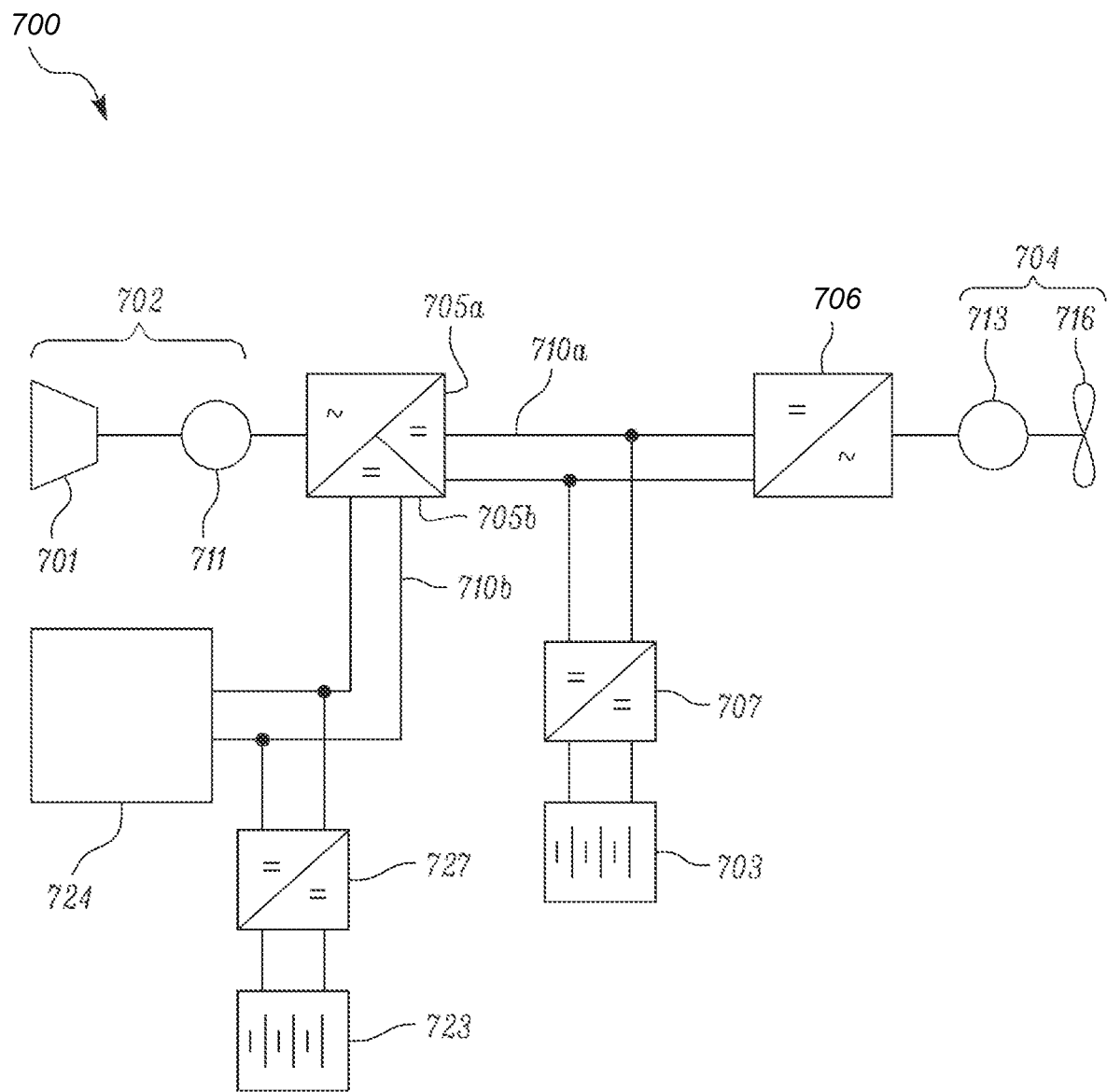
FIG. 7 is a schematic illustration of a hybrid electric aircraft propulsion system incorporating an electrical power system providing first and second DC output supplies from a common electrical machine.

FIG. 7 schematically illustrates an example aircraft power and propulsion system 700 comprising an electrical power system as described above. The propulsion system 700 is similar to that described above in relation to FIG. 2, but with first and second DC distribution buses 710a, 710b provided DC supplies by first and second AC:DC power electronics converters 705a, 705b. A generator set 702 comprises a gas turbine engine 701 driving an electrical machine 711 that provides an AC supply to the first and second AC:DC power electronics converters 705a, 705b. The first AC:DC power electronics converter 705a provides a first DC output supply to the first DC distribution bus 710a, which in this example is connected to a first DC:AC power electronics converter 707 and a battery 703 and to a DC:AC power electronics converter 706 to drive a propulsor 704 comprising a motor 713 and fan 716. The second AC:DC power electronics converter 705b provides a second DC output supply to the second DC distribution bus 710b, which in this example is connected to a second DC:AC power electronics converter 727 and a second battery 723. The second DC distribution bus 710b is connected to a load 724, which may for example comprise one or more onboard electrical systems.

The first and second DC power distribution buses 710a, 710b are galvanically isolated from each other. As such, each DC supply can have its own dedicated ground reference if desired. It is also possible to join the grounds together, without forming a ground loop, so that both DC supplies share a common ground reference if desired.

The power electronics converters described herein are all capable of passing power in both directions, i.e., from the electrical machine to the DC distribution network or from the DC distribution network to the electrical machine. It is therefore possible to start the gas turbine engine electrically from either or both of the DC distribution buses as required.

Further alternative examples may require higher DC voltage supplies, which may be achieved by connecting the first and second DC output supplies in series. The example electrical power system illustrated in FIG. 6, for example, could be configured to provide any combination of the first or second DC voltage supply or an addition of the first and second DC voltage supply. In the case where the first DC supply voltage is 270V and the second DC supply voltage is 540V, the electrical power system could provide DC supplies as 270V, 540V and 810V.

FIG. 8

Figure 8:
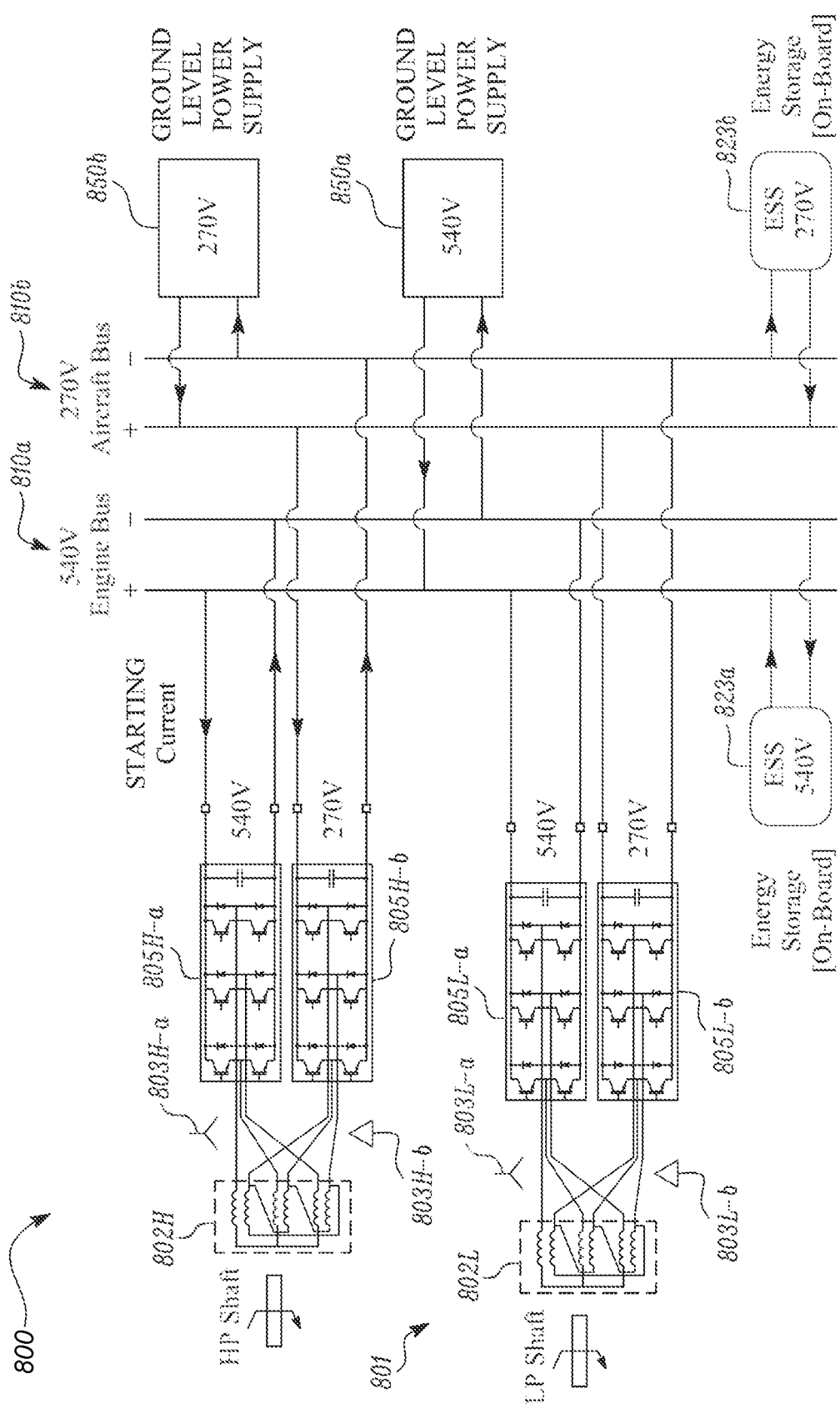
FIG. 8 is a schematic illustration of an aircraft power and propulsion system in which both star and delta windings of an electrical machine are used to apply a starting torque to a starting spool of a gas turbine engine.

As noted above, where bi-directional power converters are used, a star-delta electrical machine may not only be used to generate electrical power for supply at two DC levels (e.g., 270V and 540V), the electrical machine may also be used to electrically start the gas turbine engine by operating as a motor. In principle it is possible to start the engine electrically from either the 270V network (using only the delta windings) or the 540V network (using only the star windings). However, in applications where a high starting torque is required, and where it would be undesirable to significantly overrate the electrical machine and AC:DC power converters, it may be necessary to supply current to both the star and delta windings at the same time. FIG. 8 illustrates a first embodiment of this in an aircraft power and propulsion system 800.

Each of the LP spool and HP spool of a gas turbine 801 is coupled with a star-delta electrical machine 802H, 802L. The star connected windings 803H-a, 803L-a are connected to the higher voltage, 540V, bus 810a via respective first bi-directional AC:DC converters 805H-a, 805L-a. The delta connected windings 803H-b, 803L-b are connected the lower voltage, 270V, bus 810b via respective second bi-directional AC:DC converters 805H-b, 805L-b.

The 540V bus 810a is connected to a first on-board energy storage system 823a, which can supply the 540V bus 810a with DC power or receive DC power from the bus 810a for charging. Similarly, the 270V bus 810b is connected to a second on-board energy storage system 823b, which can supply the 270V bus 810b with DC power or receive DC power from the bus 810b for charging.

In the two-spool engine 801 of FIG. 8, the HP spool is the designated starting spool. To supply the starting torque to start the engine, the first energy storage system 823a discharges to supply the star windings 803H-a of the HP electrical machine 802H via its first converter 805H-a. Simultaneously, the second energy storage system 823b discharges to supply the delta windings 803H-b of the HP electrical machine 802H via its second converter 805H-b.

Additionally or alternatively to the ESSs 823a, 823b, the current that is supplied to the star windings 803H-a and the delta windings 803H-b may be supplied by ground equipment. FIG. 8 shows a first ground level supply 850a that supplies current at 540V to the first bus 810a and a second ground level supply 850b that supplies current at 270V to the second bus 810b. In some embodiments, the ground supplies 850a, 850b may supply the starting current to the windings of the HP electrical machine 802H and also charge the energy storage systems 823a, 823b, if necessary.

FIG. 9

Figure 9:
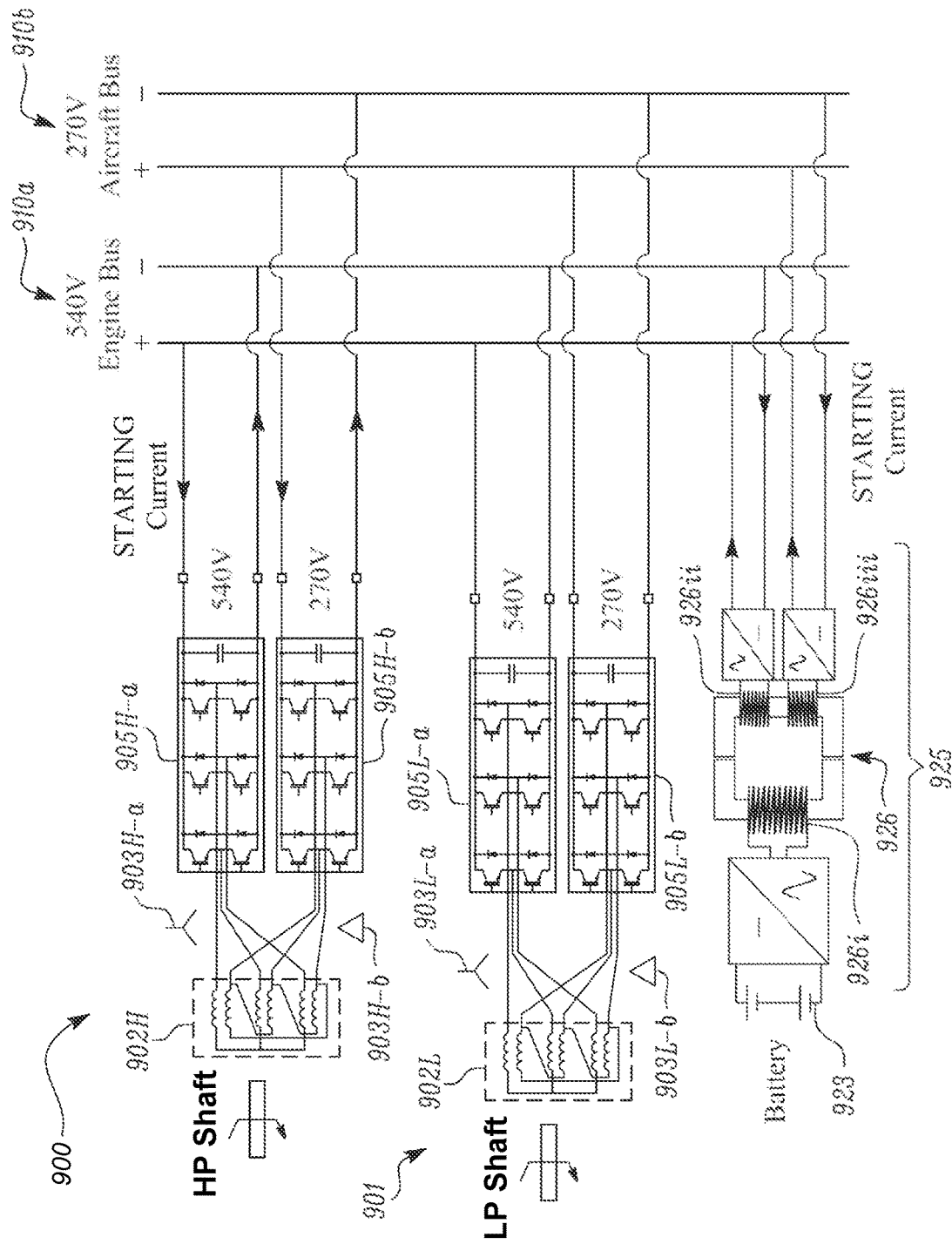
FIG. 9 illustrates an embodiment similar to that of FIG. 8 but which uses an isolated DC to DC converter.

In alternative configurations, an on-board energy storage system may interface with the electrical distribution system using a DC to DC converter. FIG. 9 illustrates an embodiment of a power and propulsion system 900 in which an isolated DC to DC converter 925 comprising an intermediate transformer 926 with two secondary windings is used to interface a single energy storage system 923 with two supplies 910a, 910b at different voltage levels.

Like FIG. 8, FIG. 9 shows a two-spool gas turbine engine 901 whose HP and LP spools each carry a star delta connected electrical machine 902H, 902L. The star windings 903H-a, 903L-a interface with a high voltage, 540V, supply bus 910a via respective first AC:DC converters 905H-a, 905L-a. The delta windings 903H-b, 903L-b interface with a low voltage, 270V, supply bus 910b via respective second AC:DC converters 905H-b, 905L-b.

The aircraft includes an on-board energy storage system 923 that interfaces with both the high-voltage bus 910a and the low-voltage bus 910b via an isolated DC to DC converter 925. The DC to DC converter 925 includes an intermediate transformer 926 having a primary winding 926i and two secondary windings 926ii, 926iii. The primary winding 926i interfaces with the energy storage system 923 via a primary DC:AC converter. The first secondary winding 926ii interfaces with the high-voltage bus 910a via a first secondary AC:DC converter 925ii. The second secondary windings 926iii interfaces with the low-voltage bus 910b via a second secondary AC:DC converter. In order to implement the 2:1 voltage ratio at the terminals of the two secondary windings 926ii, 926iii, the two secondary windings 926ii, 926iii have a 2:1 turns ratio. It will be understood that if a different voltage ratio is desired (e.g., 3:1), a different turns ratio would be appropriate.

To start the engine 901, the HP star delta machine 902H operates as a motor to provide the starting torque to the HP shaft. To do so, the energy storage system 923 discharges and supplies both the first bus 910a and the second bus 910b with power via the DC to DC converter 925. The star windings 903H-a receive power from the first bus 910a, via the first converter 905H-a, whilst the delta windings 903H-b receive power from the second bus 910b, via the second converter 905H-b. Although not shown, it will be appreciated that the power from the energy storage system 923 could be supplemented by one or more ground supplies, as in FIG. 8.

FIG. 10

Figure 10:
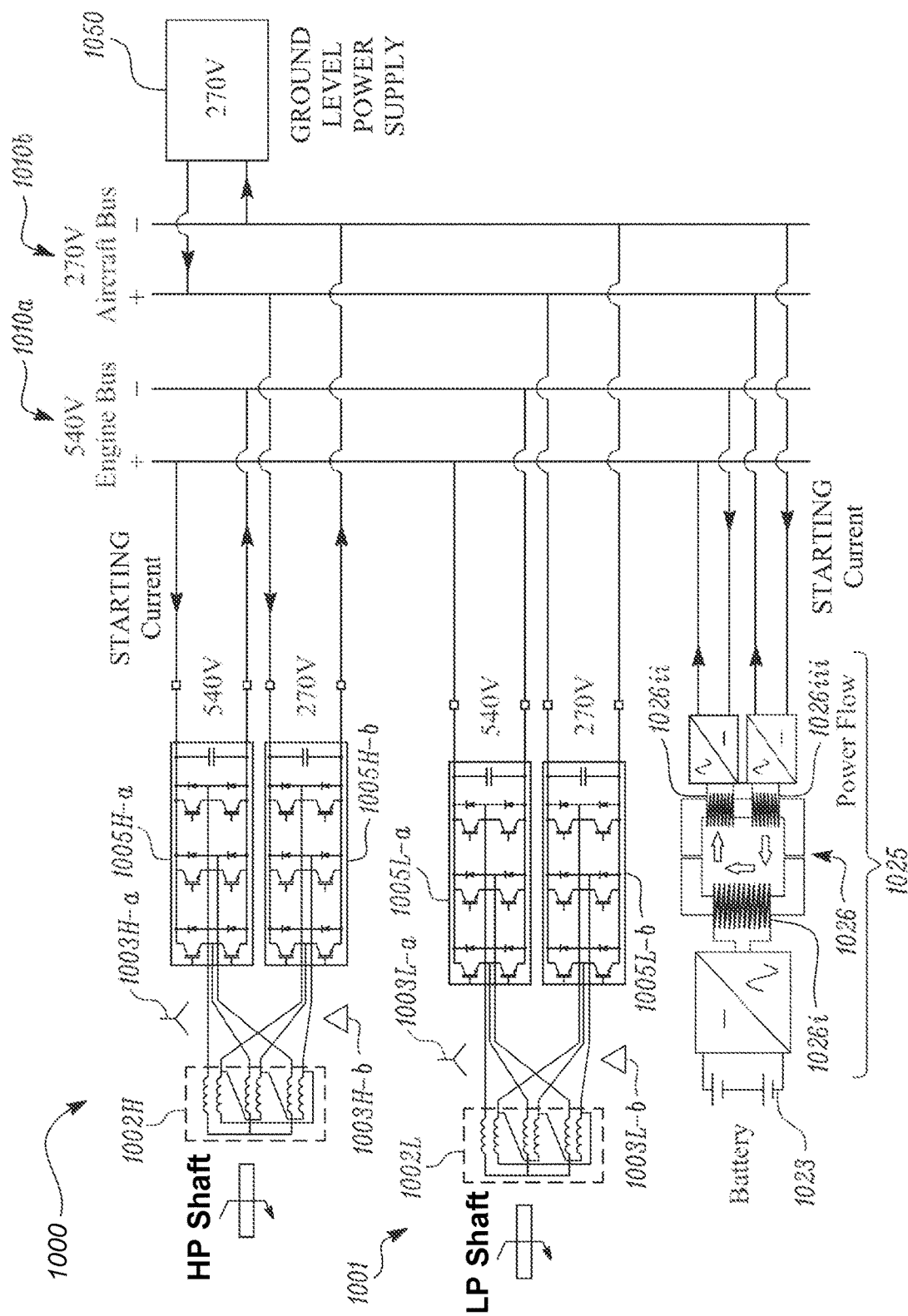
FIG. 10 illustrates another embodiment which uses an isolated DC to DC converter.

FIG. 10 illustrates a further embodiment utilizing a different power flow through an isolated DC to DC converter 1025.

As in FIG. 9, the system 1000 includes a two-spool gas turbine engine 1001 whose HP and LP spools each carry a star delta connected electrical machine 1002H, 1002L. The star windings 1003H-a, 1003L-a interface with a high voltage, 540V, supply bus 1010a via respective first AC:DC converters 1005H-a, 1005L-a. The delta windings 1003H-b, 1003L-b interface with a low voltage, 270V, supply bus 1010b via respective second AC:DC converters 1005H-b, 1005L-b.

The aircraft includes an on-board energy storage system 1023 that interfaces with both the high-voltage bus 1010a and the low-voltage bus 1010b via an isolated DC to DC converter 1025. The DC to DC converter 1025 includes an intermediate transformer 1026 having a primary winding 1026i and two secondary windings 1026ii, 1026iii. The primary winding 1026i interfaces with the energy storage system 1023 via a primary DC:AC converter. The first secondary winding 1026ii interfaces with the high-voltage bus 1010a via a first secondary AC:DC converter. The second secondary windings 1026iii interfaces with the low-voltage bus 1010b via a second secondary AC:DC converter. A turn ratio (e.g., 2:1) between the two secondary windings 1026ii, 1026iii is selected to implement the voltage ratio between the output terminals.

FIG. 10 further shows a ground level supply 1050, which in this case is connected with the low-voltage bus 1010b. To start the engine, the ground supply 1050 supplies the delta windings 1003H-b of HP electrical machine 1002H via the low voltage bus 1010b. To provide the additional starting torque via the star windings 1003H-a, the ground supply 1050 supplies the high-voltage bus 1010a with electrical power at 540V via the isolated to DC to DC converter 1025. Specifically, power flows from the second secondary winding 1026iii to the first secondary winding 1026ii via the intermediate transformer 1026. The turn ratio (e.g., 2:1) between the two secondary windings implements the voltage change from that of the low voltage bus 1010b to that of the high voltage bus 1010a. Power is then supplied from the first bus 1010a to the star windings 1003H-a to deliver the full starting torque to the HP shaft.

Whilst an arrangement in which the ground supply 1050 is connected to the second, low-voltage, bus 1010*b*, is shown, it will be appreciated that the ground supply 1050 could instead be connected to the first, high-voltage bus 1010*a*. In this case, the ground supply 1050 would directly supply the star windings 1003H-a, whilst the delta windings 1003H-b would be supplied by implementing reversed power flow through the DC to DC converter 1025.

FIG. 11

During normal use (i.e., after an engine has been started), an aircraft's energy storage system may be used intermittently or not at all. For example, an energy storage system may be intermittently discharged to meet transient peaks in platform power demand and/or to supply power to a spool-coupled electrical machine to manage engine surge margin during an engine transient. Outside of these intermittent uses, a DC-DC converter associated with the energy storage system may be essentially idle.

Figure 11:
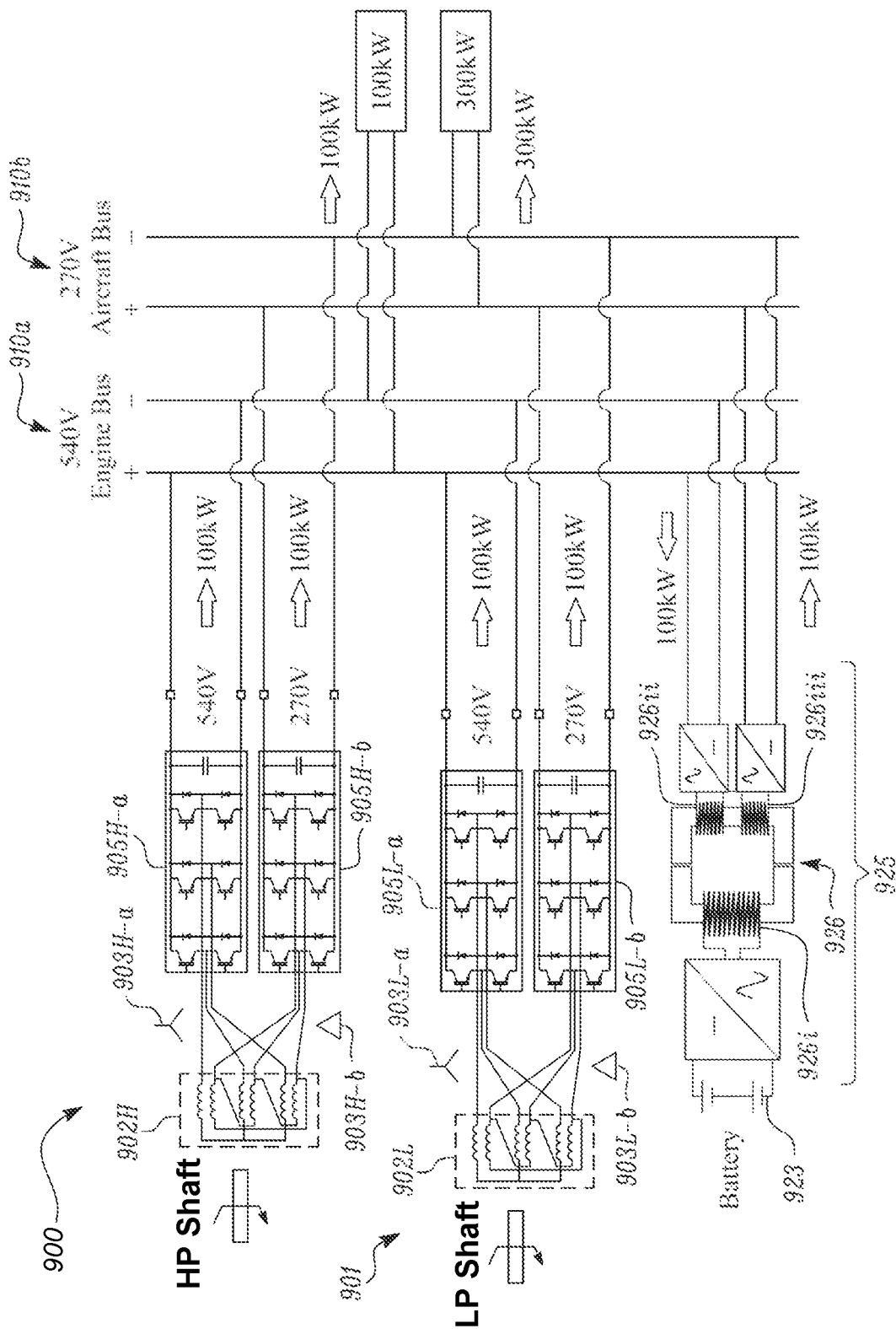
FIG. 11 illustrates an embodiment in which an idle DC to DC converter is used to balance powers available on low- and high-voltage busses.

FIG. 11 illustrates one possible use of an idle DC-DC converter, in particular as a power balancer between the high- and low-voltage systems. The features of the system 900 shown in FIG. 11 are the same as those in FIG. 9, and so their description will not be repeated for conciseness.

In use, the current flowing through and the power delivered from the star-connected windings 903H-a, 903L-a is nominally the same as the current flowing through and the power delivered from the delta-connected windings 903H-b, 903L-b. This is shown in FIG. 11, with 100 kW of power being delivered by each winding 903H-a, 903L-a, 903H-b, 903L-b. The result is that each of the high-voltage bus 910*a* and the low-voltage bus 910-*b* receives the same power, in this case 200 kW. It may, however, not be desirable to constrain the power that is drawn from the high- and low-voltage busses 910*a*, 910*b* to be the same. Purely by way of example, FIG. 11 shows the power drawn by the low voltage bus 910*b* (in this example associated with aircraft loads) to be 300 kW, whereas a lower power of 100 kW is to be drawn from the high-voltage bus 910*a*. To facilitate this difference, the idle DC-DC converter 926 associated with the energy storage system 923 is operated in a power balancing mode of operation.

In the power balancing mode of operation, the converter 925 is controlled so that one of the secondary windings 926*ii*, 926*iii* receives power from one of high- and low-voltage busses 910*a*, 910*b* whilst the other of the secondary windings 926*ii*, 926*iii* delivers power to the other of the high- and low-voltage busses 910*a*, 910*b*. In this way, different powers can be drawn from the high- and low-voltage busses 910*a*, 910*b*, and this can be achieved without, e.g., discharging or charging the battery 923. In this specific example, the first secondary winding 926*ii* absorbs 100 kW of power from the high-voltage bus 910*a* and the second secondary winding 926*iii* delivers 100 kW of power to the low-voltage bus 910*b*. The net effect is that 100 kW of power is available to loads connected to the high-voltage bus 910*a*, whereas 300 kW of power is available to loads connected to the low-voltage bus 910*b*.

FIG. 12

Figure 12:
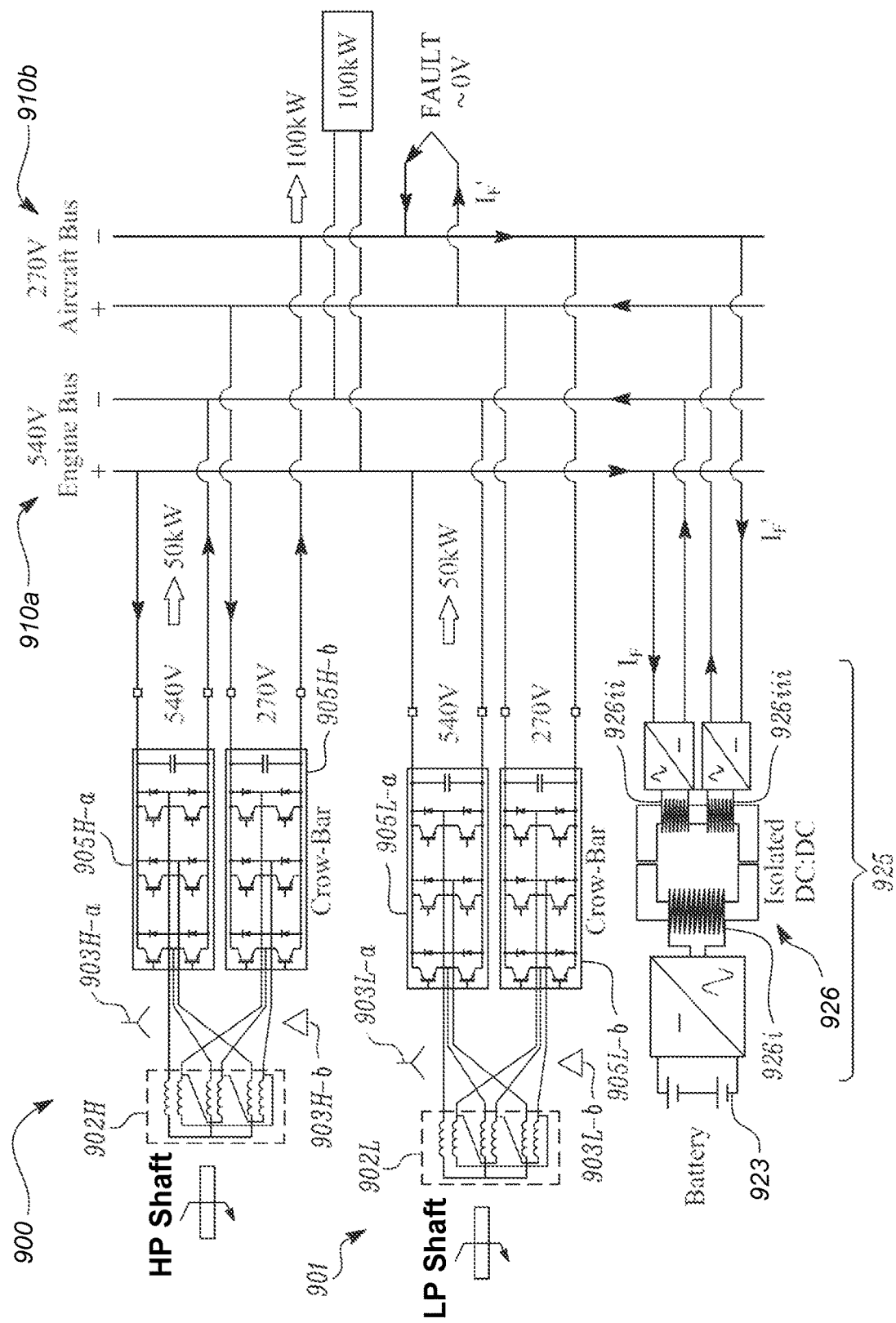
FIG. 12 illustrates an embodiment in which an idle DC to DC converter is used to control the delivery of current following a fault in a DC network.
Figure 13:
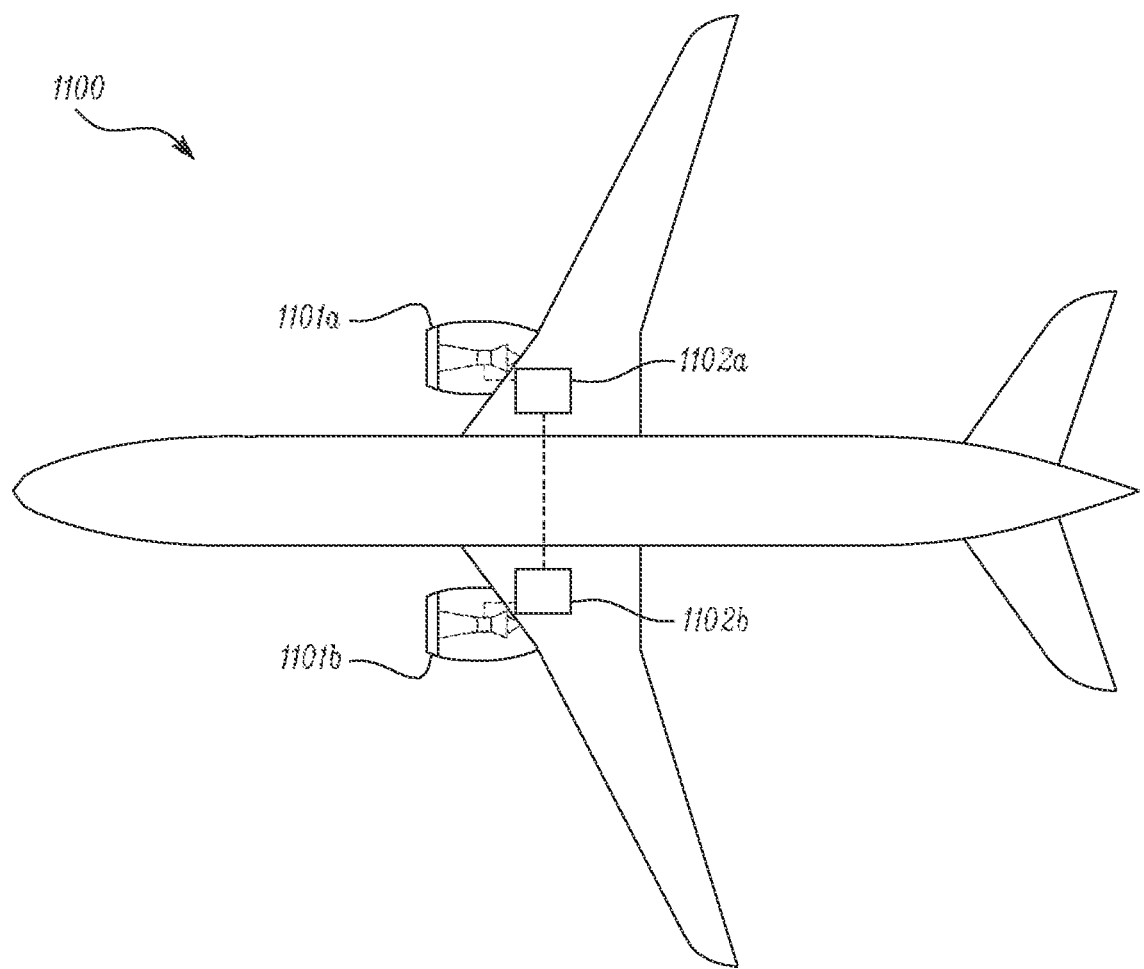
FIG. 13 is a schematic illustration of an aircraft comprising an electric power and propulsion system.

FIG. 12 illustrates another possible use of an idle DC-DC converter. As before, the features of the system 900 shown in FIG. 12 are the same as those in FIG. 9.

In the present example there is a fault (e.g., a pole-to-pole short circuit fault) in the low-voltage electrical system 910*b*. The fault results in the collapse of the voltage on the low-voltage bus 910*b*, possibly to as low as zero Volts. This may mean that the AC-DC converters 905H-b, 905L-b associated with the low-voltage bus 910*b* have no (or limited) DC-side voltage, resulting in a loss of converter control. The associated machine windings 903H-b, 903L-b do, however, continue to supply current to the low-voltage bus 910*b*, with the AC-DC converters 905H-b, 905L-b operating as uncontrolled diode rectifiers. Supplying the fault site with an uncontrolled, and possibly very high, current may be undesirable.

In the example of FIG. 12, the idle DC-DC converter 925 associated with the energy storage system 923 is used to provide some control over the current that is supplied to the fault site.

For example, the delta-connected windings 903H-b, 903L-b may be prevented from supplying uncontrolled fault current by controlling the AC-DC converters 905H-b, 905L-b to a crow-bar configuration (as will be understood by those skilled in the art, in a crowbar configuration of a converter, the semiconductor switches are controlled so that current can flow through the coils of the electrical machine but cannot be conducted through to the DC network). A controlled fault current IF' may then be made available to the fault site from the star-connected windings 903H-a, 903L-a and associated AC-DC converters 905H-a, 905L-a via the high voltage bus. Here, the first secondary winding 926*ii* of the DC-DC converter 925 may absorb a current of IF from the high-voltage bus 910*a* while the second secondary winding 926*iii* may supply a related current IF' (which may differ from IF due to the difference in the turns ratio of the secondary windings 926*ii*, 926*iii*) to the low-voltage bus 910*b*.

Various modifications to the embodiments of FIGS. 8-12 will occur to those skilled in the art. For example:

- Although gas turbines with two spools (HP and LP) are illustrated, the engines could have a different number of spools. For example, an engine may have three spools: a low-pressure (LP) spool, an intermediate-pressure (IP) spool and a high-pressure (HP) spool. In this case, the IP spool or the HP spool, or both, may be designated the starting spool(s).
- Whilst both the LP and HP spools are shown to be equipped with electrical machines, this need not be the case. Only the designated starting spool (in this case the HP spool) needs to be equipped with an electrical machine to implement the above-described starting techniques,
- Whilst 270V and 540V bus voltages have been described, other voltages could be used.
- Whilst two busses are shown, a greater number of busses may be implemented, for example using the arrangement shown in FIG. 6. An isolated DC to DC converter could also include a greater number of secondary windings.

FIG. 13

As described above, the electrical power system described herein may be part of an aircraft power and propulsion system, as illustrated schematically in FIG. 1. The aircraft 1100 comprises gas turbine engines 1101*a*, 1101*b*, one or both of which may comprise or be connected to an electrical power system 1102*a*, 1102*b* of the type as described above. Each of the gas turbine engines 1101*a*, 1101*b* may be as described above in relation to FIG. 1. The aircraft 1100 may be a hybrid electric aircraft.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the electric machine drive techniques described herein could be used for many other applications. These include, but are not limited to, automotive, marine and land-based applications.

The invention claimed is:

1. An electrical power system comprising:
   an electrical machine having first and second pluralities of windings;
   a first AC:DC power electronics converter connected to the first plurality of windings;
   a second AC:DC power electronics converter connected to the second plurality of windings;
   a switching controller configured to provide switching signals to the first and second AC:DC power electronics converters to provide a first DC supply at a DC side of the first AC:DC power electronics converter and a second DC supply at a DC side of the second AC:DC power electronics converter,
   wherein the windings of the first plurality of windings are connected to the first AC:DC power electronics converter in a star configuration and the windings of the second plurality of windings are connected to the second power electronics converter in a delta configuration.

2. The electrical power system of claim 1, wherein the first plurality is equal to the second plurality.

3. The electrical power system of claim 1, wherein a first number of turns in each winding of the first plurality of windings is greater than a second number of turns in each winding of the second plurality of windings.

4. The electrical power system of claim 3, wherein the first number is between 5% and 20% greater than the second number.

5. The electrical power system claim 1, wherein the switching controller is configured to provide the first DC supply at a first voltage level of between 1.5 to 2.5 times that of a second voltage level of the second DC supply.

6. The electrical power system of claim 5, wherein the first voltage level is twice that of the second voltage level.

7. The electrical power system of claim 5, wherein the first voltage level is 540V and the second voltage level is 270V.

8. The electrical power system of claim 1, wherein the first and second AC:DC power electronics converters are each configured to provide an output power of up to 100 kW.

9. The electrical power system of claim 1, wherein the first and second pluralities of windings are provided on a common stator of the electrical machine.

10. The electrical power system of claim 9, wherein the windings of the first plurality of windings are disposed in a first circumferential span around the stator and the windings of the second plurality of windings are disposed in a second circumferential span around the stator.

11. The electrical power system of claim 10, wherein the first and second circumferential spans are non-overlapping.

12. The electrical power system of claim 10, wherein the first circumferential span is greater than the second circumferential span.

13. The electrical power system of claim 9, wherein the electrical machine comprises third and fourth pluralities of windings, the electrical power system further comprising a third AC:DC power electronics converter connected to the third plurality of windings and a fourth AC:DC power electronics converter connected to the fourth plurality of windings, windings of the third plurality of windings connected to the third AC:DC power electronics converter in a star configuration and the windings of the fourth plurality of windings connected to the fourth AC:DC power electronics converter in a delta configuration, the switching controller configured to provide switching signals to the third and fourth AC:DC power electronics converters to provide a third DC supply at a DC side of the third AC:DC power electronics converter and a fourth DC supply at a DC side of the fourth AC:DC power electronics converter, wherein the windings of the third plurality of windings are disposed in a third circumferential span around the stator and the windings of the fourth plurality of windings are disposed in a fourth circumferential span around the stator.

14. The electrical power system of claim 13, wherein the third and fourth circumferential spans are non-overlapping with each other and with the first and second circumferential spans.

15. The electrical power system of claim 13, wherein the third circumferential span is greater than the fourth circumferential span.

16. An aircraft power and propulsion system comprising:
    a gas turbine engine; and
    an electrical power system according to claim 1,
    wherein the electrical machine of the electrical power system is mechanically coupled with a spool of the gas turbine engine.

17. The aircraft power and propulsion system of claim 16, wherein:
    the spool is a starting spool of the gas turbine engine;
    the first and second AC:DC power electronics converters are bi-directional converters; and
    the electrical machine is operable in a motor mode in which one or more power sources supply electrical power to the first plurality of windings via the first AC:DC power electronics converter and to the second plurality of windings via the second AC:DC power electronics converter.

18. The aircraft power and propulsion system of claim 17, wherein the one or more power sources includes an on-board energy storage system.

19. The aircraft power and propulsion system of claim 18, further comprising a DC to DC power electronics converter including an intermediate transformer having a primary winding, a first secondary winding and a second secondary winding, wherein the primary winding is connected to the energy storage system, the first secondary winding is connected to the first DC supply, and the second secondary winding is connected to the second DC supply.

20. An aircraft comprising the power and propulsion system of claim 16.

* * * * *